United States Patent [19]
Yang et al.

[11] Patent Number: 5,650,997
[45] Date of Patent: Jul. 22, 1997

[54] METHOD AND APPARATUS FOR USE IN A NETWORK OF THE ETHERNET TYPE, TO IMPROVE FAIRNESS BY CONTROLLING COLLISION BACKOFF TIMES IN THE EVENT OF CHANNEL CAPTURE

[75] Inventors: Henry Sho-Che Yang, Andover; Anthony G. Lauck, Wellesley; Kadangode K. Ramakrishnan, Maynard; William R. Hawe, Pepperell, all of Mass.

[73] Assignee: Digital Equipment Corporation, Maynard, Mass.

[21] Appl. No.: 735,155

[22] Filed: Oct. 24, 1996

Related U.S. Application Data

[63] Continuation of Ser. No. 438,570, May 10, 1995, abandoned, which is a continuation of Ser. No. 85,866, Jun. 30, 1993, abandoned.

[51] Int. Cl.⁶ .................................................. H04L 12/411
[52] U.S. Cl. ............................................................ 370/448
[58] Field of Search ................................. 370/85.1, 85.2, 370/85.3, 85.4, 85.5, 85.6, 85.7, 94.1; 340/825.06, 825.1

[56] References Cited

U.S. PATENT DOCUMENTS

| | | | |
|---|---|---|---|
| 4,598,285 | 7/1986 | Hoshen | 370/85.2 |
| 4,766,591 | 8/1988 | Huang | 370/60 |
| 4,979,168 | 12/1990 | Courtois et al. | 370/95.1 |
| 5,164,942 | 11/1992 | Kamerman et al. | 370/85.2 |

*Primary Examiner*—Douglas W. Olms
*Assistant Examiner*—Ajit Patel
*Attorney, Agent, or Firm*—Kenneth F. Kozik

[57] ABSTRACT

A technique for modifying the IEEE 802.3 standard for selecting backoff times in a Carrier Sense Multiple Access with Collision Detection (CSMA/CD) network, in the event that a collision is sensed by a node that has captured the network communication channel. If there is a small number of active nodes on the network, one node may capture the channel and the standard backoff algorithm makes it increasingly unlikely for another node to transmit. The new technique provides for less aggressive, i.e. longer, backoff times before at least the first retransmission attempt made by a node that has captured the channel. Three specific examples of the technique are disclosed. Even though the invention represents a departure from the standard CSMA/CD backoff algorithm, the overall average backoff times provided by the invention can be selected to be consistent with the average times provided by the standard. Moreover, nodes using the invention interoperate successfully with nodes that do not.

14 Claims, 2 Drawing Sheets

METHOD AND APPARATUS FOR USE IN A NETWORK OF THE ETHERNET TYPE, TO IMPROVE FAIRNESS BY CONTROLLING COLLISION BACKOFF TIMES IN THE EVENT OF CHANNEL CAPTURE

This application is a continuation of application Ser. No. 08/438,570, filed May 10, 1995, now abandoned which is a continuation of application Ser. No. 08/085,866, filed Jun. 30, 1993, now abandoned.

BACKGROUND OF THE INVENTION

This invention relates generally to local area networks (LANs) of the Ethernet type and, more particularly, to techniques for improving fairness of channel access in an Ethernet LAN. Ethernet is a commonly used name for a LAN that uses a network access protocol referred to as Carrier Sense Multiple Access with Collision Detection (CSMA/CD). The CSMA/CD protocol is defined in ANSI/IEEE Std 802.3, published by the Institute of Electrical and Electronics Engineers, Inc., 345 East 45th Street, New York, N.Y. 10017, and referred to in this specification as "the IEEE 802.3 standard." The standard is for a 10 Mbs (megabits/sec) CSMA/CD channel, but it will be understood that the present invention may also be applicable to a 100 Mbps channel.

Under the CSMA/CD rules for access to a network bus or cable, which will be referred to as the channel, any node or station wishing to transmit must first "listen" to make sure that the channel is clear before beginning to transmit. All nodes on the network have equal priority of access and may begin transmitting as soon as the channel is clear and a required inter-packet delay of 9.6 µs (microseconds) has elapsed. However, if a first node that has started transmitting detects a "collision" with a transmission from another node, the first node continues transmitting for a short time to make sure that all nodes wishing to transmit will detect the collision. Every other node detecting the collision also continues to transmit for a short time. Then each node that has detected a collision terminates transmission of the packet or frame. The nodes involved in the collision wait for the required interpacket delay of 9.6 µs and then select random, and therefore usually different, delay times, referred to as backoff times, before trying transmission of the same packet again.

More specifically, the IEEE 802.3 standard defines a collision backoff procedure referred to as "truncated binary exponential backoff." When a transmission attempt has terminated due to a collision, it is retried by the transmitting node, after a selected backoff time, until either the transmission is successful or a maximum number of attempts have been made and all have terminated due to collisions. The backoff time is selected by each node as an integral multiple of the "slot time," which is the maximum round-trip propagation time for the network, i.e. the time to propagate a data packet from one end of the network to the other, and back. The slot time defined by the IEEE 802.3 standard is 51.2 µs. The number of slot times selected as the backoff time before the nth retransmission is chosen as a randomly distributed integer r in the range:

$0 \leq r < 2^k$, where $k=\min(n, 10)$.

Therefore, for the first attempted retransmission the backoff time is selected as 0 or 1 slot times, for the second attempted retransmission the backoff time is selected as 0, 1, 2 or 3 slot times, for the third attempted retransmission the backoff time is selected as 0, 1, 2, 3, 4, 5, 6 or 7 slot times, and so forth. The maximum backoff time, for the tenth attempted retransmission may be up to $2^{10}-1$, or 1,023 slot times, i.e. 52.4 ms.

The IEEE 802.3 standard is designed to achieve optimal performance, in throughput, latency and fairness, when the number of nodes in the network is relatively large. When the number of active nodes, i.e. nodes having data packets to transmit, is small, e.g. two nodes, the IEEE 802.3 standard exhibits an undesirable effect referred to as the capture effect, in which one of the nodes may effectively capture the channel and transmit a succession of data packets in a back-to-back fashion for a relatively long period of time. The capture effect is best understood from a simple example.

Suppose there are two active nodes, A and B, in a network and they begin transmitting at approximately the same time, resulting in a first collision. They each select backoff times of 0 or 1 slot time, in accordance with the standard backoff algorithm. Suppose further that node A selects zero backoff time and node B selects one slot time as its backoff time. Obviously, node A will be able to successfully transmit on its first attempt at retransmission. Node B will wait a full slot time before making its first retransmission attempt, but by this time node A has staffed transmitting a second data packet, i.e. node A is transmitting successive packets back-to-back, with only the required interpacket gap (IPG) separating them. Node B experiences a second collision on its first data packet, but for node A it is still a "first" collision for trying to transmit a second data packet. In accordance with the standard backoff algorithm, node A selects a backoff of 0 or 1 slot time, but node B selects a backoff of 0, 1, 2 or 3 slot times. Therefore, node B has only one chance in eight of winning access to the channel (if node B chooses 0 and node A chooses 1). Node A, however, has five chances in eight of winning channel access. (Two of the eight possibilities will result in another collision.) Clearly, it is more probable, actually five times more probable, that node A will retain access to the channel, as compared with node B. If the probable occurs, and node A transmits its second data packet, the situation becomes progressively more difficult for node B to transmit. If another collision occurs on node B's next attempt to retransmit, this will be node B's third attempt, but node A's "first" again. Node A's backoff is still 0 or 1 slot time, but node B's is selected from 0 through 7 slot times. Node A is then thirteen times as likely to win access to the channel on the next attempted retransmission. For the nth attempt at retransmission by node B, node A will be $(2^n-3)$ times more likely to win access to the channel. For the maximum value of n, i.e. 10, the unfairness factor between the two active nodes will be $2^{10}-3$, or 1,021.

For network protocols that require a receiving node to acknowledge that it has received a packet, the situation is further aggravated by the need to transmit acknowledgment messages on the network. For example node A captures the channel and is sending successive packets to node B, node B may be unable to acknowledge even the first received packet. Node A will eventually have to give up the channel to allow acknowledgements to flow back from node B, but this is an inefficient process and channel utilization goes down.

It will be appreciated from the foregoing that there is a need for improvement over the standard approach for selecting random backoff times in a network using the CSMA/CD protocol. Ideally, any improved technique should still comport with the objects of the IEEE 802.3 standard and should be compatible with nodes that use the standard without improvement. The present invention achieves these ends, as will become apparent from the following summary.

SUMMARY OF THE INVENTION

The present invention resides in a technique that modifies the standard backoff approach in the event that a channel capture condition is detected. The basic method of the invention is for use in a node of a network employing a Carrier Sense Multiple Access with Collision Detection (CSMA/CD) protocol to control channel access. The method comprises the steps of sensing when this node has captured the channel by successfully transmitting a first data packet and beginning to transmit a second data packet without relinquishing the channel to another node; then, after sensing capture of the channel, sensing a collision between the second packet transmission and a transmission by another node; and finally, after sensing a collision, selecting a backoff time to wait before attempting retransmission, wherein the backoff time before at least the first retransmission attempt is selected to be actually or potentially longer than if the node had not captured the channel. The less aggressive backoff time selected for a node that has captured the channel gives a node that has not captured the channel at least one transmission opportunity that it would not otherwise have.

More specifically, the step of selecting a backoff time includes selecting a first retransmission attempt backoff time and a second retransmission attempt backoff time with an overall average value no less than the average backoff time for first and second retransmission attempts when there is no channel capture. Thus, the method of the invention may be viewed as maintaining adherence to the standard approach, as measured in average backoff times, but with improved performance in the case of channel capture in a network with very few active nodes.

In accordance with a first embodiment of the invention, the step of selecting a backoff time includes selecting a first backoff time of approximately two slot times, to be used prior to a first attempt to retransmit, where a slot time is approximately equal to at least the round trip signal propagation time for the full length of the channel; selecting a second backoff time of zero, to be used prior to a second attempt to retransmit; and selecting third and subsequent backoff times in accordance with a standard approach used when no channel capture has been detected.

In accordance with a second embodiment of the invention, the step of selecting a backoff time includes selecting a first backoff time that is a random number of slot times between zero and three, to be used prior to a first attempt to retransmit; selecting a second backoff time that is a random number of slot times between zero and one, to be used prior to a second attempt to retransmit; and selecting third and subsequent backoff times in accordance with the standard approach used when no channel capture has been detected.

In accordance with a third embodiment of the invention, the step of selecting a backoff time includes selecting a first backoff time of four slot times, to be used prior to a first attempt to retransmit; and selecting second and subsequent backoff times in accordance with a standard approach used when no channel capture has been detected.

The invention may also be defined in terms of apparatus, comprising means for sensing when the node has captured the channel by successfully transmitting a first data packet and beginning to transmit a second data packet without relinquishing the channel to another node; means operative after sensing capture of the channel, for sensing a collision between the second packet transmission and a transmission by another node; and means operative after sensing a collision, for selecting a backoff time to wait before attempting retransmission, wherein the backoff time before at least the first retransmission attempt is selected to be actually or potentially longer than if the node had not captured the channel.

It will be appreciated from the foregoing that the present invention represents a significant advance in the field of local area networks of the Ethernet or IEEE 802.3 type. In particular, the invention provides an improved procedure for selecting collision backoff times in the event of capture of the network channel by one node. The invention improves fairness of channel access in networks with small numbers of active nodes, since these configurations are most prone to unfairness caused by channel capture. Other aspects and advantages of the invention will become apparent from the following more detailed description, taken in conjunction with the accompanying drawings.

DESCRIPTION OF THE PREFERRED EMBODIMENTS

Figure 1:
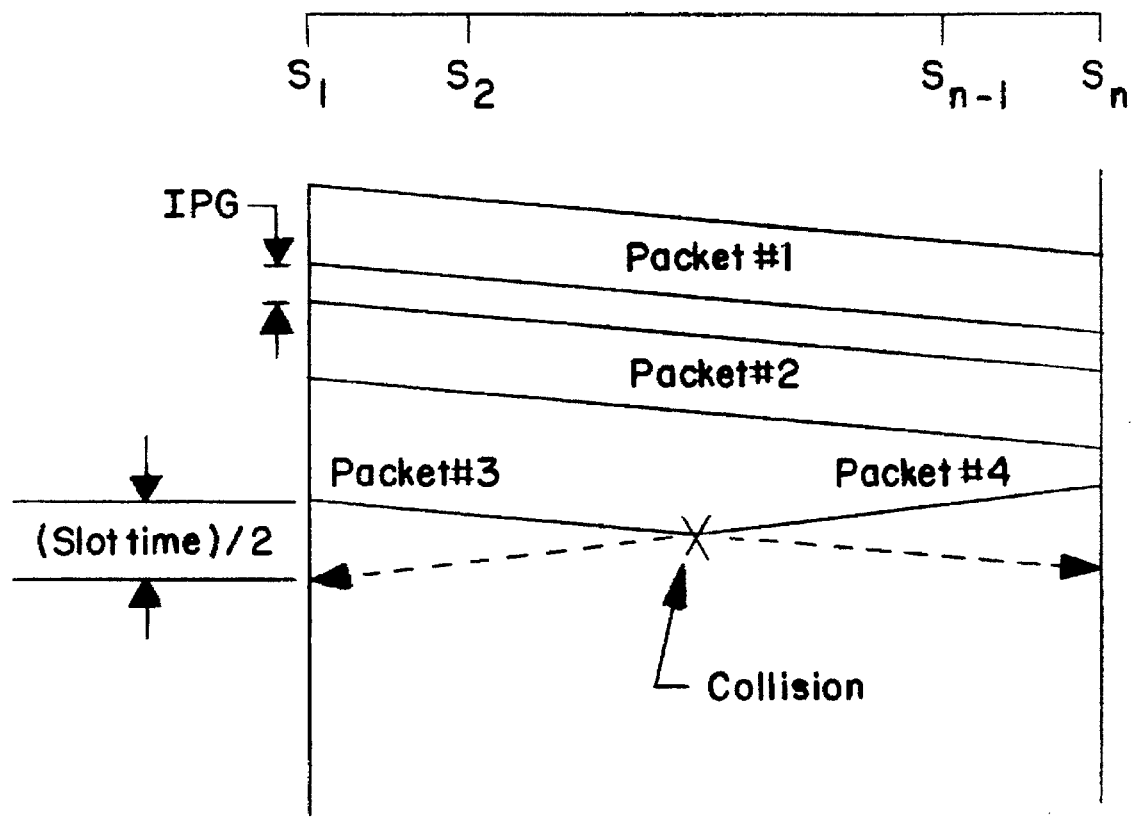
FIG. 1 is a diagram showing the principles of collision detection in a CSMA/CD LAN.

As shown in the drawings for purposes of illustration, the present invention is concerned with an improved technique for randomly selecting backoff times in a LAN that uses a network access protocol referred to as Carrier Sense Multiple Access with Collision Detection (CSMA/CD). Under the CSMA/CD rules for access to a network channel, any node wishing to transmit must first "listen" to make sure that the channel is idle before beginning to transmit. All nodes on the network have equal priority of access and may begin transmitting as soon as the channel is idle and a required inter-packet delay has elapsed.

FIG. 1 is a graphical diagram that is useful in visualizing channel access concepts in a LAN of the Ethernet or IEEE 802.3 standard type. The horizontal axis of the diagram represents distance along the channel from a first node $S_1$ on the left-hand side to an nth node $S_n$ on the right-hand side. The vertical axis represents time. The area designated Packet #1 represents the transmission of a data packet by node $S_1$ onto the channel. The vertical dimension of this area indicates that the packet takes a certain time for $S_1$ to transmit it. The downward slope of the area is consistent with the propagation delay associated with the packet as it is transmitted along the channel. Thus node $S_n$ receives the packet some time after it was transmitted. After transmitting Packet #1, node $S_1$ waits for a required interpacket gap (IPG) time, which the standard defines as 9.6 µs, and if no other channel activity is detected, begins transmitting another packet, as indicated by the area "Packet #2." This is a back-to-back transmission of successive data packets, and thus far it has been assumed that there was no competition for access to the channel.

The next portion of FIG. 1 shows the effect of practically simultaneous transmission attempts from nodes $S_1$ and $S_n$. Transmission of Packets #3 and #4 were both started after the transmitting nodes detected an idle channel. The packets collide in mid-channel, as indicated diagrammatically in FIG. 1, and an indication of the collision is provided to the transmitting nodes, and to all the other nodes, as indicated by the broken lines in the figure. It will be appreciated from the figure that the time for node $S_1$ to learn of the collision is the round-trip propagation time from the transmitting node to the collision point, and back. It will also be appreciated that the collision point may be almost at the other end of the channel, adjacent to node $S_n$. Then the delay in learning of the collision would be the round-trip propagation time from one end of the channel to the other. This time is referred to as one slot time, and is defined by the IEEE 802.3 standard as a maximum of 51.2 µs.

In the event of a collision, each active node defers its next attempt to transmit by a random time that is an integral multiple r of the slot time. Specifically, for the nth attempt at retransmission r is chosen from the range:

$$0 \leq r < 2^k, \text{ where } k=\min(n, 10).$$

Therefore, the backoff time is selected from the following ranges of times, depending on how many retransmission attempts have been made:

| Retransmission attempt no. n | Backoff time in slot times r (selected at random from:) |
|---|---|
| 1 | 0,1 |
| 2 | 0,1,2,3 |
| 3 | 0,1,2,3,4,5,6,7 |
| 4 | 0 through 15 |
| n | 0 through $(2^n-1)$ |
| 10 (maximum n) | 0 through 1,023 |

The standard backoff algorithm is designed to achieve optimal performance, in throughput, latency and fairness, when the number of nodes in the network is relatively large. When the number of active nodes, i.e. nodes having data packets to transmit, is small, e.g. two nodes, the IEEE 802.3 standard exhibits an undesirable effect referred to as the capture effect, in which one of the nodes may effectively capture the channel and transmit a succession of data packets in a back-to-back fashion for a relatively long period of time. The capture effect arises because the range of backoff times increases exponentially with the number of retransmission attempts. If one of two active nodes loses channel access, the losing node has a progressively decreasing probability of gaining access so long as the other node continues to transmit back-to-back packets.

In accordance with the invention, when a node senses that it has captured the channel, after the next collision it selects a backoff time that is less aggressive (i.e. tends to be longer) than the backoff time designated by the standard backoff algorithm. This provides an increased opportunity for another node to gain access to the channel, and results in improved performance when there are only two active nodes, or in networks having a small number of nodes.

Figure 2:
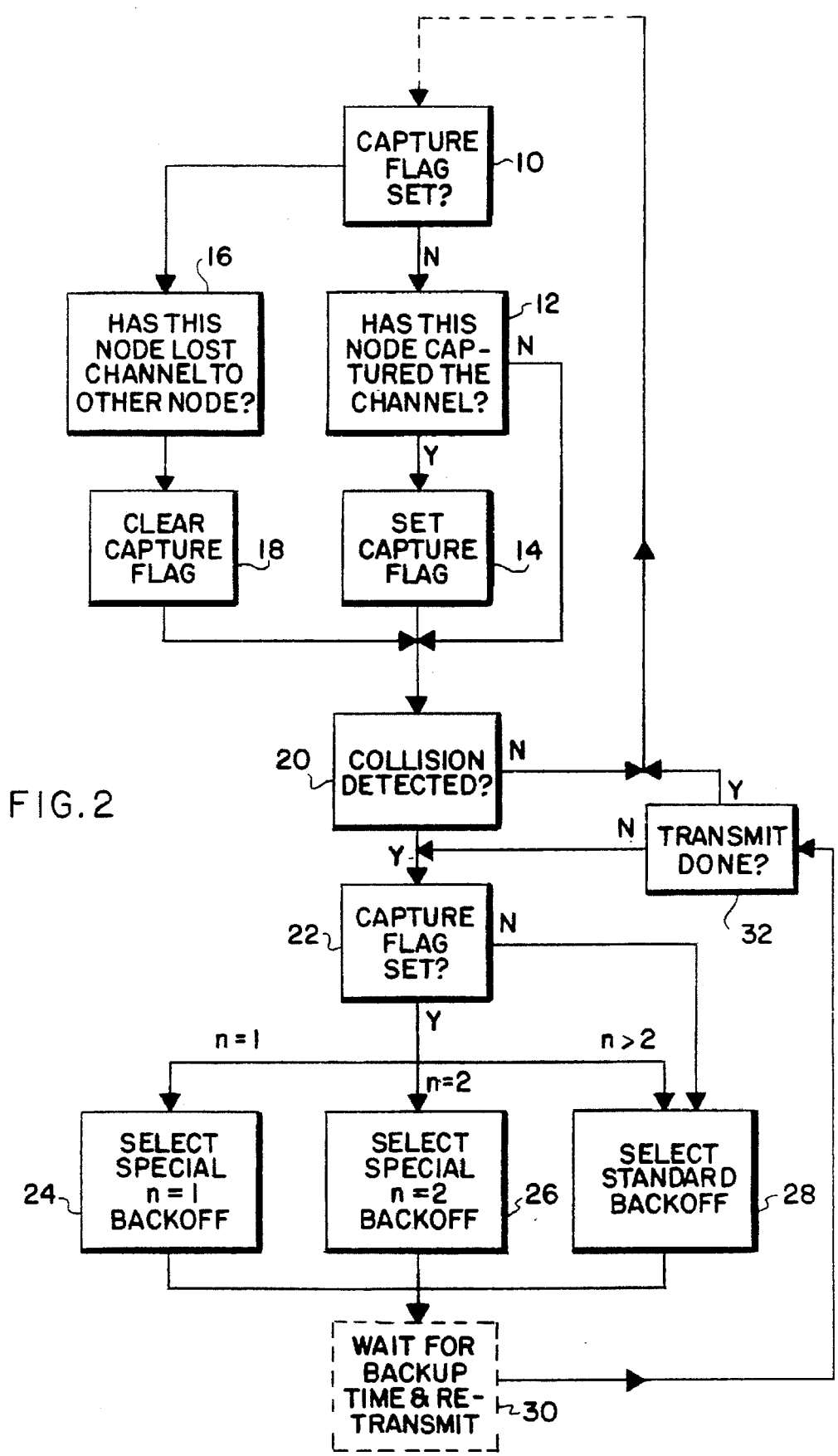
FIG. 2 is a flowchart showing the principles of the present invention.

FIG. 2 is a flowchart showing the functions performed in each node implementing this improved feature. The node continually monitors its operation to determine whether it has captured the channel, and maintains a capture flag to record this status. In the presently preferred embodiment of the invention, channel capture is defined to have occurred when a node begins transmitting a data packet without having received a packet, or a fragment of a packet, from the network since the node's transmission of a prior packet. Under this definition, the subsequent packet transmission may occur immediately upon the expiration of a required inter-packet gap (IPG) following the transmission of the prior packet, or may occur at some later time following transmission of the prior packet. When a node successfully transmits a packet, it retains memory of this event during a subsequent idle period. When the node starts a subsequent packet transmission without an intervening transmission by another node, the node is said to have captured the channel. This channel capture test is easy to implement and results in rapid and consistent application of the principle of the invention.

An alternative approach to testing for channel capture is to require back-to-back transmissions by a node before the node is declared to have captured the channel. Therefore, channel capture will be detected upon beginning transmission of a second packet immediately after transmitting a first packet and waiting for the required interpacket gap. Although this approach is satisfactory, it is more difficult to implement than the preferred one, and sometimes results in a delay in the application of the invention. When two nodes are competing for channel access, a number of collisions may be needed before one node gains access and is subsequently declared to have captured the channel. In the preferred approach to declaring channel capture, at any instant in time one of two active nodes on the network will always be considered to have captured the channel, even though there may be intervening idle periods. Therefore, on the occurrence of a first collision the node that has captured the channel immediately backs off less aggressively.

As indicated in block 10, if this node currently does not have its capture flag set, a check is made (block 12) to determine if the node has captured the channel, i.e. whether it is transmitting the second of two back-to-back packets. If so, the capture flag is set, as indicated in block 14. If the capture flag was not set, a check is made to determine whether this node has lost access to the channel, as indicated in block 16. If so, the capture flag is cleared, as indicated in block 18.

Following these steps to maintain the capture flag, if a collision is detected, as indicated in block 20, an appropriate backoff time is selected, to determine the time that must elapse before retransmission is initiated. If no collision is detected, processing in the node continues, and the capture flag maintenance steps discussed above will be repeated continually. It will be understood, of course, that other forms of processing take place in the node, but these have been omitted for clarity.

When a collision is detected (in block 20), the capture flag is again checked, in block 22. If it is set, a special backoff time may be selected, depending on how many transmission attempts have been made. For the first retransmission attempt after a collision (and after detection of capture by this node), a selected, less aggressive backoff time is selected, as indicated in block 24. A less aggressive backoff time is one that is longer than the standard backoff period. For the second retransmission attempt, another selected backoff time may be selected, as indicated in block 26. In two of the three specific examples to be described in more detail below, the backoff time for the second retransmission attempt is more agressive, i.e. shorter, than the standard time. For third or later attempts at retransmission (n>2), the standard backoff time is selected, as indicated in block 28; i.e. a backoff time of from 0 through 7 slot times for n=3, 0 through 15 for n=4, and so forth. If the capture flag is not set, as determined in block 22, the standard backoff time is also selected. After selection of a backoff time, the node waits until expiration of the backoff time before attempting to retransmit a data packet, as indicated in block 30. After attempting to retransmit, the next operation performed depends on whether or not a packet has been successfully transmitted. If the transmit operation for the packet is complete, as determined in block 32, processing continues with block 10. If the transmit operation for the packet is not complete, processing continues with block 22, to check the capture flag and choose an appropriate backoff time before the next retransmission attempt.

The selection of backoff times for a node in the capture condition may be made in accordance with one of several different specific approaches. A common feature of the approaches is that each provides for a less aggressive (i.e. potentially or definitely longer) backoff time for the first retransmission attempt by a node that has captured the channel. Three examples are provided below. Example 1 is the presently preferred embodiment of the invention.

EXAMPLE 1

For n=1 (first retransmission attempt), a backoff of 2 slot times is always selected for a node that has captured the channel. For n=2 (second retransmission attempt), a backoff of 0 slot times is selected. For n>2, the standard backoff time of r slot times is selected, where r is in the range: $0 \leq r < 2^k$, where k=min (n, 10). Note that the average of first two collision backoff times is one slot time, which is the same as the average for the first two backoff times using the standard algorithm.

EXAMPLE 2

For n=1 (first retransmission attempt), a backoff of r slot times is selected for a node that has captured the channel, where r in this case is in the range $0 \leq r < 4$. For n=2 (second retransmission attempt), a backoff of r slot times is selected, where r in this case is in the range $0 \leq r < 2$. For n>2, the standard backoff time of r slot times is selected, where r is in the range: $0 \leq r < 2^k$ and k=min (n, 10). Note that, as in Example 1, the average of the first two collision backoff times is the same as the average for the first two backoff times using the standard algorithm. In fact the first two backoff times are equivalent to those in the standard algorithm, but reversed in sequence.

EXAMPLE 3

For n=1 (first retransmission attempt), a backoff of 4 slot times is always selected for a node that has captured the channel. For n>1 (second or subsequent retransmission attempt), the standard backoff time of r slot times is selected, where r is in the range:

$$0 \leq r < 2^k, \text{ where } k = \min(n, 10).$$

In this example, the average of the first two backoff times is higher than the average for the standard algorithm. Basically, this approach provides for a relatively long backoff as soon as the capture condition is detected, followed by an immediate return to the standard approach.

The following table compares the standard approach with those of the three examples of the present invention:

|  | Backoff Time (Slot times) | | |
| --- | --- | --- | --- |
| Backoff technique | n = 1 | n = 2 | n = 3 |
| IEEE Standard | 0–1 | 0–3 | 0–7 |
| Example #1 | 2 | 0 | 0–7 |
| Example #2 | 0–3 | 0–1 | 0–7 |
| Example #3 | 4 | 0–3 | 0–7 |

The invention allows nodes in a CSMA/CD network to have improved performance when the network has only a small number of active nodes. The invention is becoming of increasing usefulness because there appears to be a trend toward LAN segments having fewer nodes, to provide more bandwidth to users. These smaller networks are more likely to expose the capture effect, which results in performance degradation. The invention applies equally well to 100 Mbps CSMA/CD LANs and to 10 Mbps CSMA/CD LANs. Moreover, nodes implementing the invention interoperate without modification with nodes using the IEEE 802.3 standard for collision backoff.

It will be appreciated from the foregoing that the present invention represents a significant advance in the field of CSMA/CD LANs. In particular, the invention provides for greatly improved fairness of access to a LAN channel when there is a small number of active nodes on the network. From a user standpoint, improved fairness also improves overall message throughput and latency. It will also be appreciated that, although three specific embodiments of the invention have been described, various modifications may be made without departing from the spirit and scope of the invention. Accordingly, the invention should not be limited except as by the appended claims.

We claim:

1. For use in a node of a network employing a Carrier Sense Multiple Access with Collision Detection (CSMA/CD) protocol for channel access, a method for improving fairness of access, comprising the steps of:

sensing that said node has captured the channel, by said node successfully transmitting a first data packet and beginning a second packet transmission without relinquishing the channel to another node;

after sensing capture of the channel, sensing a collision between the second packet transmission and a transmission by another node; and after sensing said collision by said second packet, selecting a backoff time to wait before attempting retransmission, said backoff time selected from a plurality of potential backoff times, said plurality of potential backoff times divided into a first group of potential backoff times to be used in the event that said node has not captured said channel, and a second group of potential backoff times to be used in the event that said node has captured said channel; and, selecting said backoff time from said second group of potential backoff times in response to sensing that said node has captured the channel.

2. A method as defined in claim 1, wherein:

the step of selecting said a backoff time includes selecting a first retransmission attempt backoff time and a second retransmission attempt backoff time with an overall average value no less than the average backoff time for first and second retransmission attempts when there is no channel capture.

3. A method as defined in claim 1, wherein the step of selecting said backoff time includes:

selecting a first backoff time of approximately two slot times, to be used prior to a first attempt to retransmit, where a slot time is approximately equal to at least the round trip signal propagation time for the full length of the channel;

selecting a second backoff time of zero, to be used prior to a second attempt to retransmit; and selecting third and subsequent backoff times in accordance with a standard approach used when no channel capture has been detected.

4. A method as defined in claim 1, wherein the step of selecting said backoff time includes:

selecting a first backoff time that is a random number of slot times between zero and three, to be used prior to a first attempt to retransmit, where a slot time is approximately equal to at least the round trip signal propagation time for the full length of the channel;

selecting a second backoff time that is a random number of slot times between zero and one, to be used prior to a second attempt to retransmit; and selecting third and subsequent backoff times in accordance with a standard approach used when no channel capture has been detected.

5. A method as defined in claim 1, wherein the step of selecting said backoff time includes:

selecting a first backoff time of four slot times, to be used prior to a first attempt to retransmit, where a slot time is approximately equal to at least the round trip signal propagation time for the full length of the channel; and selecting second and subsequent backoff times in accordance with a standard approach used when no channel capture has been detected.

6. A method as defined in claim 1, wherein the step of sensing when this node has captured the channel includes:

sensing when this node has begun to transmit a packet subsequent to the successful transmission of a prior packet, without detecting any intervening transmission by another node.

7. A method as defined in claim 1, wherein the step of sensing when this node has captured the channel includes:

sensing when this node has begun to transmit a packet after a standard interpacket gap interval following the successful transmission of a prior packet.

8. For use in a node of a network employing a Carrier Sense Multiple Access with Collision Detection (CSMA/CD) protocol for channel access, apparatus for improving fairness of access, comprising:

means for sensing that said node has captured the channel, by said node successfully transmitting a first data packet and beginning a second packet transmission without relinquishing the channel to another node;

means operative after sensing capture of the channel, for sensing a collision between the second packet transmission and a transmission by another node; and means, operative after sensing a collision, for selecting a backoff time to wait before attempting retransmission, said backoff time selected from a plurality of potential backoff times, said plurality of potential backoff times divided into a first group of potential backoff times to be used in the event that said node has not captured said channel, and a second group of potential backoff times to be used in the event that said node has captured said channel; and, means for selecting said backoff time from said second group of potential backoff times in response to sensing that said node has captured the channel.

9. Apparatus as defined in claim 8, wherein:

the means for selecting said backoff time includes means for selecting a first retransmission attempt backoff time and means for selecting a second retransmission attempt backoff time, wherein the first and second retransmission attempt backoff times have an overall average value no less than the average backoff time for first and second retransmission attempts when there is no channel capture.

10. Apparatus as defined in claim 8, wherein the means for selecting said backoff time includes:

means for selecting a first backoff time of approximately two slot times, to be used prior to a first attempt to retransmit, where a slot time is approximately equal to at least the round trip signal propagation time for the full length of the channel;

means for selecting a second backoff time of zero, to be used prior to a second attempt to retransmit; and means for selecting third and subsequent backoff times in accordance with a standard approach used when no channel capture has been detected.

11. Apparatus as defined in claim 8, wherein the means for selecting said backoff time includes:

means for selecting a first backoff time that is a random number of slot times between zero and three, to be used prior to a first attempt to retransmit, where a slot time is approximately equal to at least the round trip signal propagation time for the full length of the channel;

means for selecting a second backoff time that is a random number of slot times between zero and one, to be used prior to a second attempt to retransmit; and means for selecting third and subsequent backoff times in accordance with a standard approach used when no channel capture has been detected.

12. Apparatus as defined in claim 8, wherein the means for selecting said backoff time includes:

means for selecting a first backoff time of four slot times, to be used prior to a first attempt to retransmit, where a slot time is approximately equal to at least the round trip signal propagation time for the full length of the channel; and means for selecting second and subsequent backoff times in accordance with a standard approach used when no channel capture has been detected.

13. Apparatus as defined in claim 1, wherein the means for sensing when this node has captured the channel includes:

means for sensing when this node has begun to transmit a packet subsequent to the successful transmission of a prior packet, without detecting any intervening transmission by another node.

14. Apparatus as defined in claim 1, wherein the means for sensing when this node has captured the channel includes:

means for sensing when this node has begun to transmit a packet after a standard interpacket gap interval following the successful transmission of a prior packet.

* * * * *